United States Patent [19]
Catanzaro et al.

[11] Patent Number: 5,790,283
[45] Date of Patent: Aug. 4, 1998

[54] OPTIMIZATION OF OVERLAPPING HOLOGRAPHIC LENS ARRAY FOR CREATING VIA MATRIX

[75] Inventors: Brian Catanzaro; Adlai H. Smith, both of San Diego, Calif.

[73] Assignee: Litel Instruments, San Diego, Calif.

[21] Appl. No.: 538,536

[22] Filed: Sep. 29, 1995

[51] Int. Cl.$^6$ .............. G03H 1/08; G02B 5/32; G02B 27/44
[52] U.S. Cl. .............. 359/9; 359/15; 359/565
[58] Field of Search .............. 359/9, 15, 565, 359/571; 219/121.68

[56] References Cited

U.S. PATENT DOCUMENTS 5,144,484  9/1992  Southwell ............... 359/565
5,633,735  5/1997  Hunter et al. ............ 359/9

OTHER PUBLICATIONS

Fienup, J.R., (1980) "Iterative method applied to image reconstruction and to computer-generated holograms", *Optical Engineering*, vol. 19, No. 3, pp. 297–305.

Kim, Myung Soo and Guest, Clark C., (1990), "Simulated annealing algorithm for binary phase only filters in pattern classification", *Applied Optics,*, vol. 29, No. 8, pp. 1203–1208.

Seldowitz, Michael A., et al., (1987), "Synthesis of digital holograms by direct binary search", *Applied Optics*, vol. 26, No. 14, pp. 2788–2798.

*Primary Examiner*—Paul M. Dzierzynski
*Assistant Examiner*—Audrey Chang
*Attorney, Agent, or Firm*—Townsend and Townsend and Crew; William Michael Hynes

[57] ABSTRACT

A mask for generating a high density regular matrix of working images for generating a corresponding high density regular matrix of vias in a substrate, the computer generated holographic images from overlapped subapertures are processed for maximum fluence. For each working image, a diverging wave front of the first order is propagated using Fresnel diffraction to produce for that wave front the corresponding first order holographic image at a central unit cell. The first order holographic image for each of the working images to be produced by the unit cell is added until the configuration of a unit mask cell containing portions of all working images to be broadcast is attained. The projection from the unit cell to working image is arbitrarily altered to attain the smallest local maximum first order transmission requirement within the central unit cell; the large local maximum first order transmission requirements are essentially moved outside the bounds of the central unit cell. Thereafter, the obtained first order intensity pattern for the central unit cell that represents the holographic image with the smallest local maximum first order transmission requirement is arbitrarily clipped in transmission of the first order. The remaining clipped first order transmission requirement is re-normalized.

6 Claims, 15 Drawing Sheets

OPTIMIZATION OF OVERLAPPING HOLOGRAPHIC LENS ARRAY FOR CREATING VIA MATRIX

This invention relates to masks containing holograms for creating a matrix of high density vias in a substrate. More particularly, mask manufacture utilizing techniques for optimizing overlapping working images from overlapping subapertures is disclosed for delivering higher intensity and high ablating power levels over conventionally created holograms.

BACKGROUND OF THE INVENTION

Phase mask machining is known. Specifically, coherent light scans a transparent or reflective mask. The mask is provided with transparent or reflective diffractive forms in the pattern of computer generated holograms which alter the phase and amplitude of the coherent light incident upon the mask. The patterns project working images to a workpiece or substrate which is "machined" by ablation, typically by the placement of apertures such as vias through the workpiece.

For the creation of computer generated holograms, diffraction of the so-called "first order" of the coherent light is considered. Unless specifically stated otherwise, in the following discussion it will be assumed that the computer generated hologram only deflects this "first order."

So-called "whole aperture" holograms are known in the prior art. In such holograms, every discrete portion of a mask contributes to any image produced by the mask. Correspondingly, any change to any image produced by the mask rearranges the entirety of the mask.

In MacDonald et al. U.S. Pat. No. 5,362,940 entitled Use of Fresnel Zone Plates for Material Processing issued Nov. 8, 1994, phase mask machining was disclosed utilizing so-call subapertures. These subapertures have the advantage of destroying the interdependency of the images of the mask. Where an image is changed, only its subaperture has to be changed. Thus, in this patent, each subaperture contained its own image information typically exclusive of the remaining subapertures.

In the above patent, each subaperture contains at least two subsections of optical information. First, the subaperture contains convergence information. The coherent light (of the first order) when scanning the subaperture comes to focus at a working distance from the mask. This function can be referred to as focus or convergence and usually takes the concentration of the scanning light at a working image from an intensity where no ablation will occur to a substrate to an intensity where ablation can occur at the substrate.

Second, the subaperture contains image information. Specifically, and by constructively and destructively interfering the amplitude and phase of the rays of coherent light, a working image of tailored intensity can be generated by the subaperture. By way of example, we have constructed working images of designed intensity profile which can ablate apertures of specific shape for the generation of ink jet nozzles.

It was realized in MacDonald et al. U.S. Pat. No. 5,362,940 that some subapertures may be advantageously overlapped. That is to say, adjacent subapertures could contain interdependent image information; but not all subapertures would contain interdependent image information. Unlike the case of the so-called "whole aperture" hologram, this overlap of image information is among a limited number of adjacent subapertures. Likewise, in this patent application, overlap is only disclosed between a limited number of adjacent subapertures.

DISCOVERY

It has now become desirable to make a mask having high density of vias. Specifically, we are now ablating substrates where an area of one square foot contains more than one million vias having dimensions of 15 microns with center to center spacing between the apertures of 250 microns. In making these via arrays, it becomes desirable to:

1. Have the total area from which a working image is created large so that greater focus and thus greater fluence and total energy can be utilized to generate the working image; and, 2. Have the total area from which a working image is created large so that working images of greater precision and thus vias of greater precision can be generated.

In the normal ablation of substrates, it is usual to have one subaperture for each discrete working image generated. This enables high intensity images to be simply generated.

Where the highest possible density of working images is to be generated for the highest possible density vias on a substrate, we have discovered it is required that the subapertures overlap. In this case, each subaperture is still confined to one image—but the subapertures overlap one another. This enables the effective subaperture to have a large diameter for both bring maximum intensity to the working image as well as to produce a working image which is precise.

The reader will understand that discovering the problem to be solved can constitute invention; accordingly and to the extent that this problem of subaperature overlap has not been recognized as a necessity for generating high density vias, invention is claimed:

By way of example, and taking regular row and column arrays of subapertures, it is best to consider the case of a central subaperture—and all immediately adjacent subapertures. Presuming that the subapertures are arrayed in regular rows and columns, each central subaperture will have eight adjacent immediately adjacent subapertures. Specifically, four subapertures will be above, below, to one side, and to the other side. Likewise, the remaining four subapertures will be diagonal—upper and low left diagonal and upper and lower right diagonal—for the total of eight immediately adjacent subapertures.

As will become apparent when the preferred embodiment is described, we prefer to utilize not only the immediately adjacent subapertures—but the secondarily adjacent subapertures. Thus, we consider a total of 49 subapertures arrayed around a central unit cell contributing to a corresponding array of 49 working images. This gives for each image produced a subaperture of relatively large diameter.

Unfortunately, subaperture overlap contains its own problems. Specifically, where a single subapertures is overlapped to produce two images, efficiency of light transmission drops. Light is lost due to loss of the orders of light that are not used by the working images produced. Some discussion of this phenomena is helpful.

Presuming that 49 subapertures are overlapped, and no further attempts are made to optimize the resulting hologram, virtually all portions of the hologram will be found to have large first order transmission requirements or "spikes." These large first order transmission requirements are in the minority; most of the first order transmission requirements will be of reduced intensity compared to the spikes. Consequently, the spikes have two effects.

First, they have been found to contribute in major extent to the sharpness or definition of the resulting working images.

Second, and as to the remaining portions of the hologram, the average first order transmission is vastly reduced in intensity. What this means as a practical matter is that light passes through the hologram largely undeflected into the desired order (1). And when the light is undeflected, it forms background to the desired working images. Simply stated, the desired working images have reduced intensity.

Assuming an infinitely large mask with each unit cell of the mask producing the matrix of 49 subapertures that we prefer, each subaperture will contribute to one image. However, each discrete unit cell of the hologram on the mask will contribute to 49 images. This being the case, and assuming a regular first order hologram generated without hologram modification, the intensity through each discrete element of glass will be diminished.

To solve these problems, we have developed the following protocol.

SUMMARY OF THE INVENTION

In a mask for generating a high density regular matrix of working images for generating a corresponding high density regular matrix of vias in a substrate, the computer generated holographic images from overlapped subapertures are processed for maximum fluence. Assuming an infinite mask field, adjacent subapertures are overlapped; in the case of the preferred embodiment, 49 subapertures are overlapped to produce a central unit mask cell which contributes to all 49 desired working images. With respect to the central unit mask cell, for each working image, a diverging wave front of the first order is propagated using Fresnel diffraction to produce for that wave front the corresponding first order holographic image. The first order holographic image for each of the working images to be produced by the unit mask cell is added until the configuration of a unit mask cell containing portions of all (49) working images to be broadcast is attained. This central unit cell contains complex patterns with essentially unpredictable local minima and maxima transmission requirements of the first order. Further, and more importantly, the average transmission requirements for the first order are considerably less than unity. Very little light of the first order—the light from which the working images are generated—passes through such an unmodified unit cell. As a consequence, it is generally unsuitable in unmodified form to be utilized to generate a mask for producing a high density array of working images.

To correct this condition, either the working distance between the subaperture and working image or the divergence of light to the working image, or both, are arbitrarily altered with respect to the first order. This is done only with respect to the central unit cell. Variation arbitrarily occurs to attain the smallest local maximum first order transmission requirement within the central unit cell; the large local maximum first order transmission requirements are essentially moved outside the bounds of the central unit cell.

Thereafter, the obtained first order intensity pattern for the central unit cell that represents the holographic image with the smallest local maximum first order transmission requirement is arbitrarily clipped in transmission of the first order. We clip the remaining maxima of transmission in the first order about 20%, leaving 80% of the signal remaining. The remaining clipped first order transmission requirement is re-normalized; for example by dividing by 0.80 to increase first order transmission. There results a new central unit cell configuration high overall first order transmission. This unit cell contains the holographic pattern which can be used for endlessly and repeating overlapping subapertures for generating from each unit cell the preferred 49 working images.

This increase fluence has at least three advantageous effects. First, the resulting working images have higher contrast; the background of undeflected light is reduced. Second, the increased fluence results in higher rates of instantaneous ablation which each coherent light (laser) pulse. Third, greater overall ablative power is delivered to the substrate in any given unit of time. Substrates having a density of vias in the order of one million vias of 15 μm diameter on 250 μm center to center spacing can result.

We disclose a preferred method for the optimization of the holographic images. The reader will realize that other holographic techniques for the optimization of fluence of the first order exist. However, invention is claimed in the requirement to have discrete subapertures for each working image and overlap and optimize those images to produce high density regular arrays of working images.

Likewise, we here talk about the first order. It will be understood that in so far as other orders have utility, they are likewise covered by the scope of this disclosure.

DESCRIPTION OF THE PREFERRED EMBODIMENT

Figure 1A:
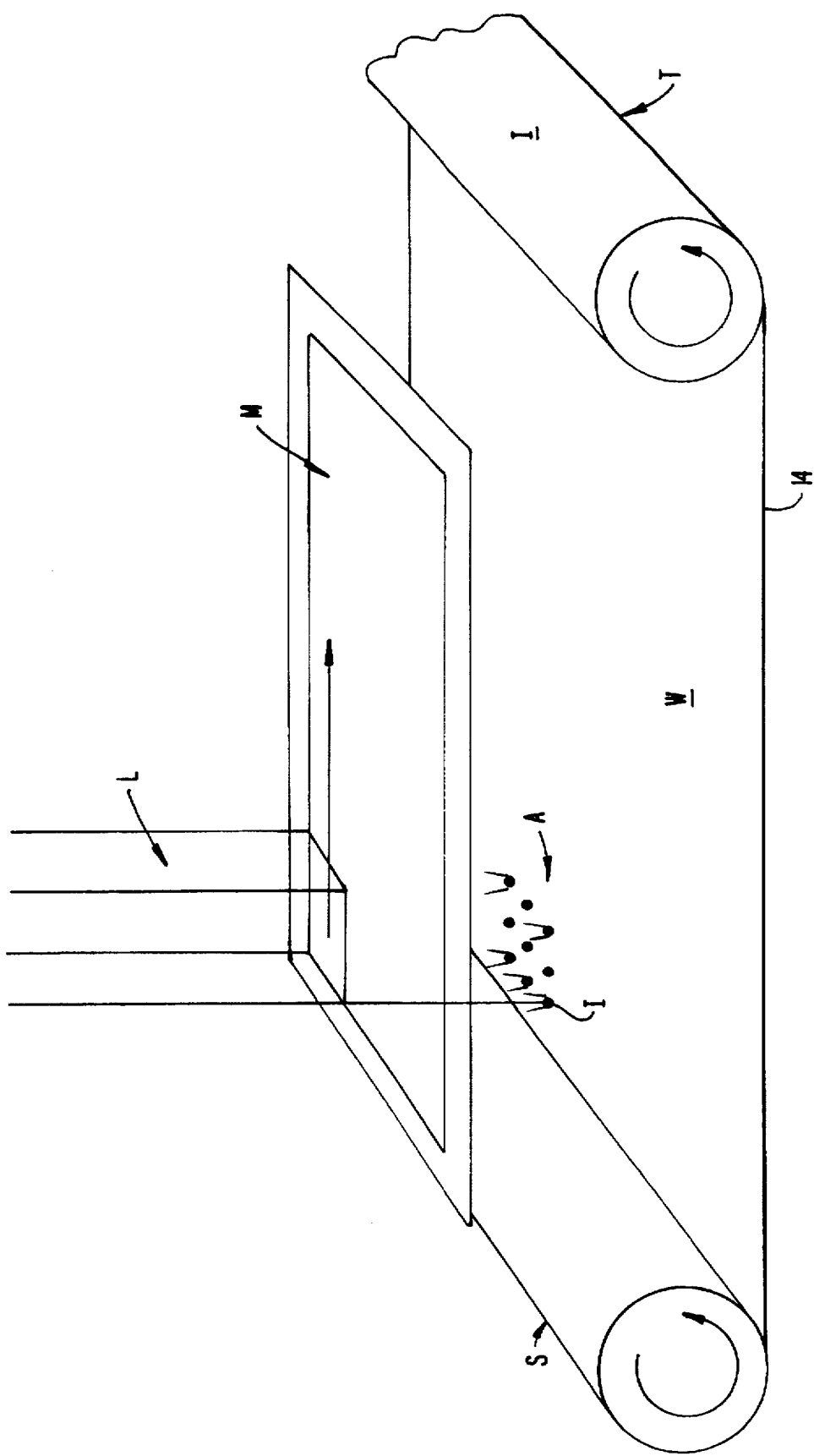
FIG. 1A and 1B are respective schematics illustrating a mask being scanned by coherent light to produce a regular array of vias on a workpiece and a unit mask cell of the mask having 49 adjacent working images with a single unit cell being shown projected around the central working image of the 49 cell array.

Referring to FIG. 1, mask M is shown being scanned by coherent light L. Coherent light L projects working images I to workpiece W. Workpiece W constitutes thin flexible membrane 14 which is incrementally advanced from supply roll S to take up roll T.

The reader will understand that we require a "regular array" apertures A be ablated in thin flexible membrane 14. This can take the form of rows and columns of apertures A. It will be understood that other regular and repeating patterns can also be used. For example, apertures A can be staggered, placed in an hexagonal array, or the like.

Figure 1B:
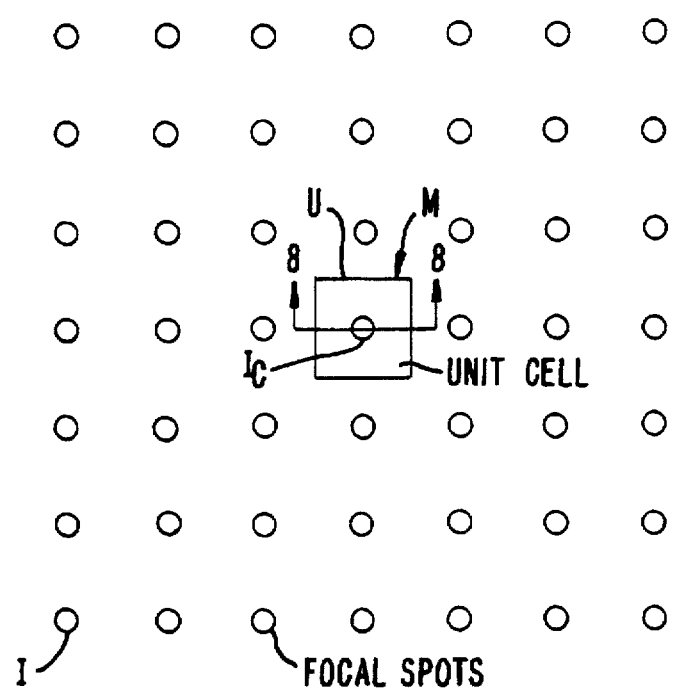

Referring to FIG. 1B, a very small section of mask M is illustrated. Only unit cell U is illustrated. This unit cell U assumes that mask M is essentially endless and does not include so-called "end effects." Presuming that mask M is made of unit cells U endlessly tiled, working images I will be formed.

In the embodiment that we utilize, each unit cell U takes part in projecting forty nine (49) side-by-side working images I. These include eight (8) working images I that are immediately adjacent central image $I_C$, and images included in the next two surrounding rows for the total of forty nine working images I.

Figure 2:
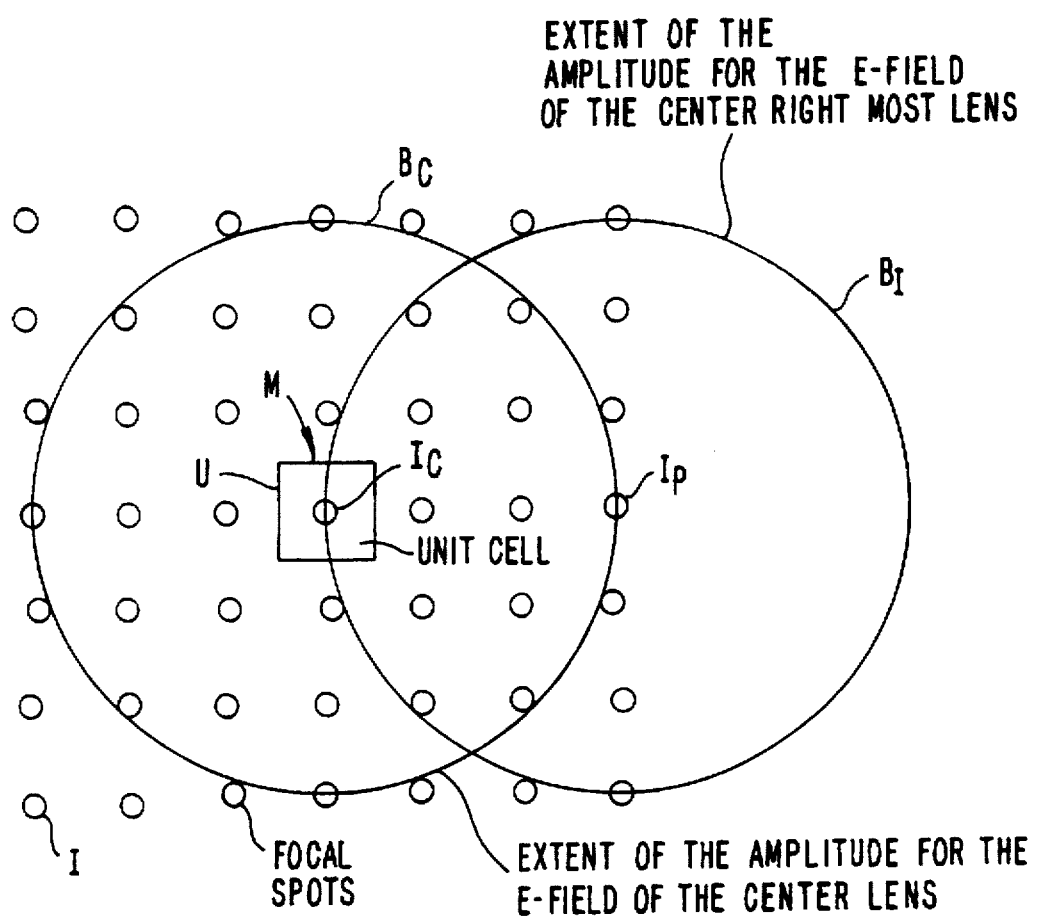
FIG. 2 illustrates the 49 adjacent working images with the single unit cell of FIG. 1 with two large subapertures, one subapertures being projected around the central working image and one subaperture being projected about a side working image—all other subapertures are omitted as they would needlessly complicate the illustration.

Referring to FIG. 2, unit cell U is shown having central image $I_C$ surrounded by central subaperture $B_C$. Likewise a peripheral subaperture $B_P$ is shown about peripheral image $I_P$. It will be observed that portions of subapertures B all lie within the bounds of unit cell U.

As it turns out, unit cell U contains image information for all 49 working images I illustrated. To save confusion, all other subapertures B have not been specifically illustrated. It is a sufficient example to illustrate central image $I_C$ with central subaperture $B_C$ and peripheral image $I_P$ with peripheral subaperture $B_I$.

Figure 4:
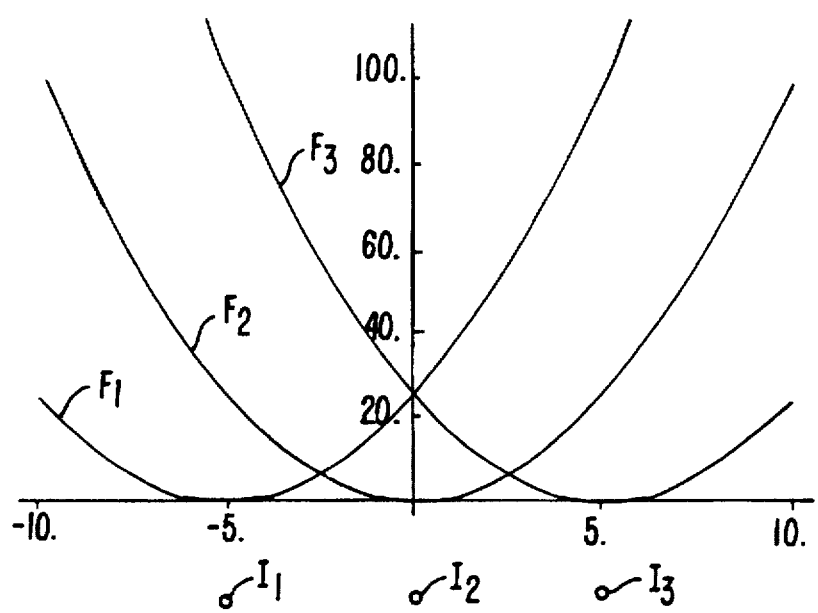
FIG. 4 is a plot of required first order transmission to generate only three adjacent working images.

Having gone this far, attention can now be directed to FIG. 4 for the understanding of the complexity that three side-by-side images $I_{1-3}$ can generate. This simple case will be illustrated while the reader remembers that our preferred embodiment includes forty nine such images for each unit cell U.

Figure 5:
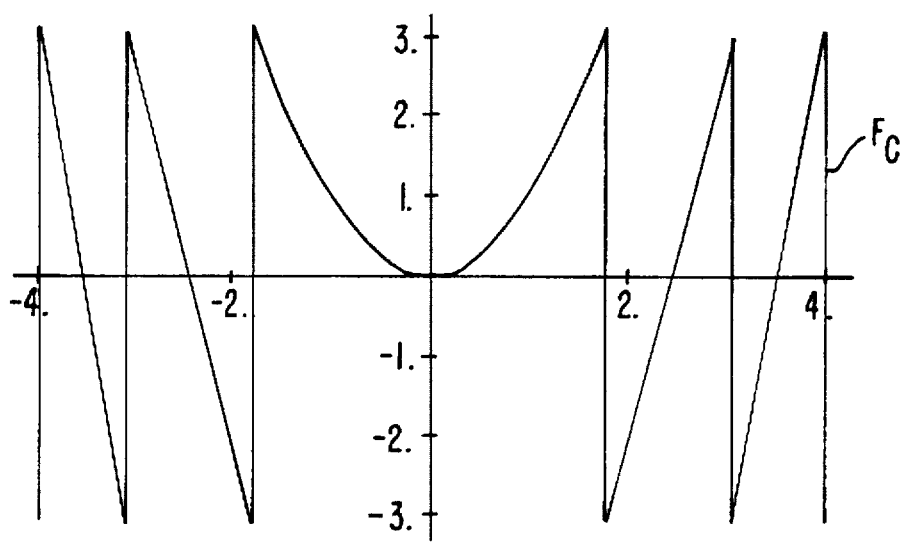
FIG. 5 is a plot of required first order transmission of a central and a side working images.
Figure 6:
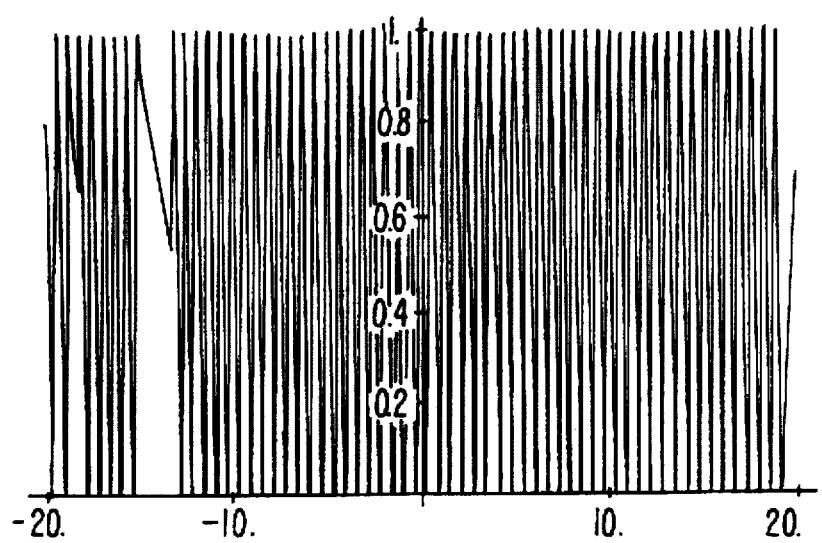
FIG. 6 is a plot of required first order transmission of the two side working images.
Figure 7:
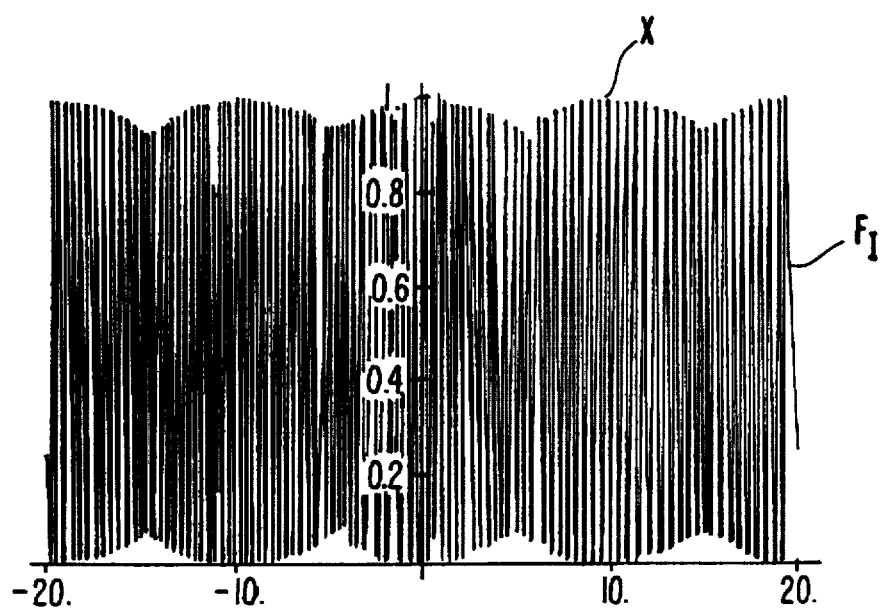
FIG. 7 is a plot of required first order transmission of all three images demonstrating the complexity of just three images so as to remind the reader that the combination of 49 such images constituting the preferred embodiment of this invention generates much greater transmission complexity.

Referring to FIG. 4, wave form or phase front $F_1$ for producing image $I_1$, wave form $F_2$ for producing image $I_2$, and wave form $F_3$ for producing image $I_3$ are all illustrated. FIG. 5 represents wavefront $F_2$ modulo 2 Pi. When complex fields $F_1$ and $F_2$ are added together, the resulting transmission profile (normalized to 1 at its peak) is illustrated by FIG. 6. Note the oscillations in transmission or relative diffraction efficiency into the first order vary rapidly and have an average value of ½. This means that overlapping just two subapertures generally leads to a loss in diffraction efficiency of 50%. FIG. 7 is similar to FIG. 6 but now complex fields $F_1$, $F_2$ and $F_3$ are added together and the resulting relative transmission or diffraction efficiency into the +1 order plotted. In this case the rapid variation in transmission have an average value of ⅓ so that the three overlapped subapertures have a loss in diffraction efficiency of 67%. The reader is again reminded that the illustrated plot is for 3 such images; in the preferred embodiment we include the addition of the images of forty nine such images for a central unit cell.

Figure 8:
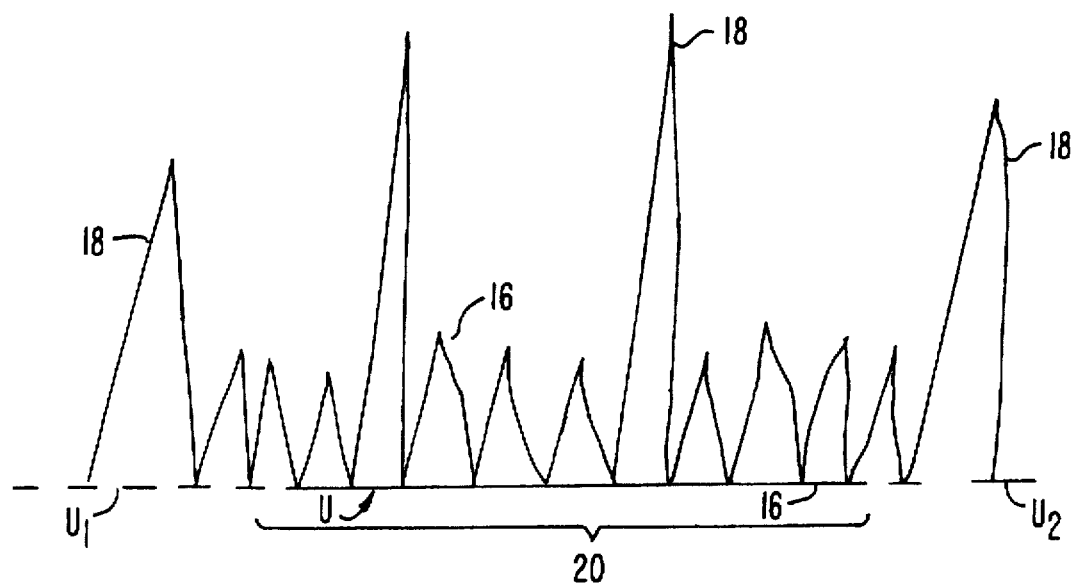
FIG. 8 is an imaginary diagram illustrating spikes of first order transmission with respect to a section taken across the unit cell generated by this invention.

Referring further to FIG. 7, it will be noted that integrated transmission $F_I$ includes maxima X which are points of maximum transmission of the first order of diffracted light. Thus for three such combined images, slight maxima X are produced. It turns out that where forty nine such working images I are combined, the maxima become accentuated— they rise to a much larger relative height than the remaining normal transmission levels required for the hologram. In FIG. 8, average maxima 16 are plotted along with large maxima or spikes 18 across section 8—8 of unit cell U shown in FIG. 1B. Further, and with reference to FIG. 8 only, the location of large maxima 18 are shown for unit cells $U_{1-2}$ which lie on either side of unit cell U.

It will be remembered from the summary of the invention that we disclose alteration of either the working distance, the convergence of light to working images I, or both to reduce the occurrence of large maxima 18 within unit cell U. It will be understood that such manipulation is arbitrary. What is done is to alter these parameters to reduce the occurrence of large maxima 18 within the bounds of unit cell U. This can be a somewhat laborious process which is accompanied by appropriate generation of average maxima 16 and large maxima 18. However, and given a suitable time interval, for a "regular pattern", we have always found that such manipulation can indeed produce such a pattern as that illustrated in FIG. 9.

Figure 9:
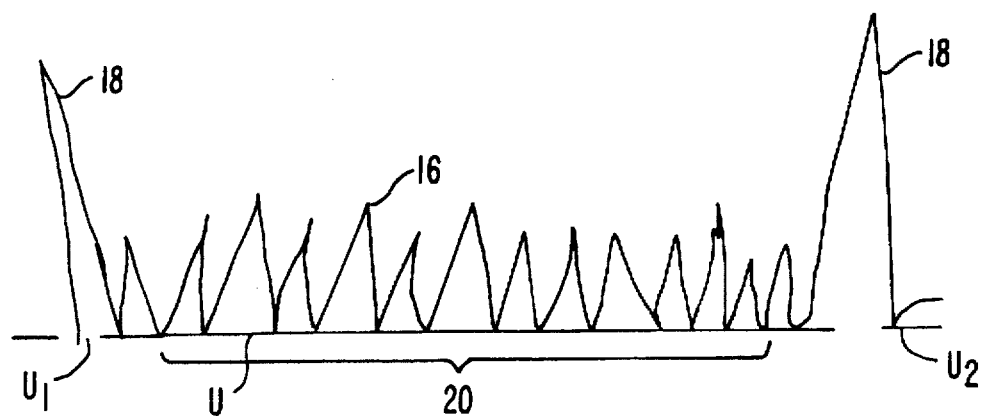
FIG. 9 is an altered diagram of first order transmission illustrated in FIG. 8 showing a randomly obtained movement of the spikes "outside" of a dimension of the central unit cell and showing the cell having reduced maxima of first order transmission.

Further, and with continued reference of FIG. 9, it will be observed that large maxima 18 have moved to sections produced by adjacent unit cells $U_{1-2}$. It will be understood that this can be ignored; what is occurring is "if" the unit cell were to include the adjacent cell space of unit cell $U_1$ or $U_2$, such large maxima 18 would appear. As it is, unit cell U does not include such space—and the presence of large maxima 18 outside the bounds of unit cell U can be ignored because unit cell U is repeated throughout the pattern.

Figure 10:
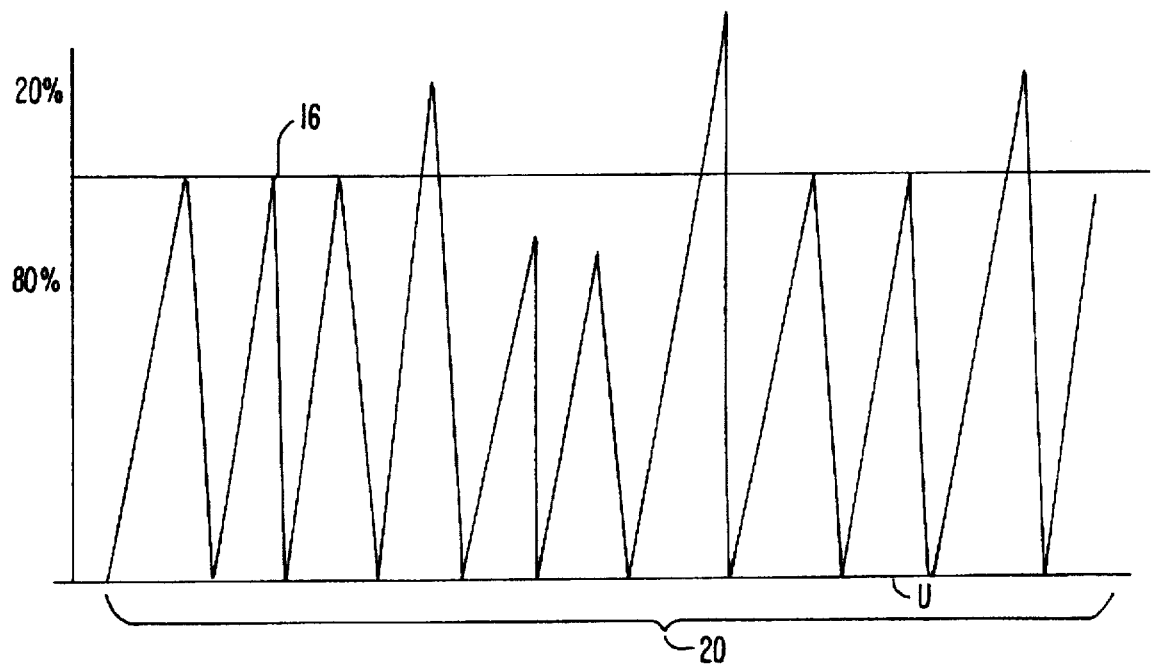
FIG. 10 illustrates the diagram of FIG. 9 with the remaining maxima of first order transmission being reduced by a factor in the order of 20%.

FIG. 10 illustrates the next step in our preferred process. Taking largest maxima 18', we reduce all other peaks within unit cell U to 80% of largest remaining maxima 18'. This in effect constitutes an arbitrary "haircut" to largest remaining maxima 18' and all remaining average maxima 16. Thereafter, and with reference to FIG. 11, the remaining signals are normalized—here by amplifying these signals by a factor 1/0.8. Stopping here, and comparing FIG. 8 with FIG. 11, the results of the process can be understood.

As to unit cell U, it will be understood that average maxima 16 and large maxima 18 represent portions of the hologram where the light being utilized to create the hologram is transmitted. Comparing large maxima 18 with average maxima 16 in FIG. 8, two things will be understood. First, large maxima 18 represents the maximum transmission of light for the particular "order" from which the holographic image is being created. Second, and as compared to large maxima 18, average maxima 16 are small— but at the same time constitute the bulk of the transmission requires for the hologram. As a result, coherent light L of the order from which the hologram is created, will in large measure be rejected by the hologram illustrated in FIG. 8.

Figure 11:
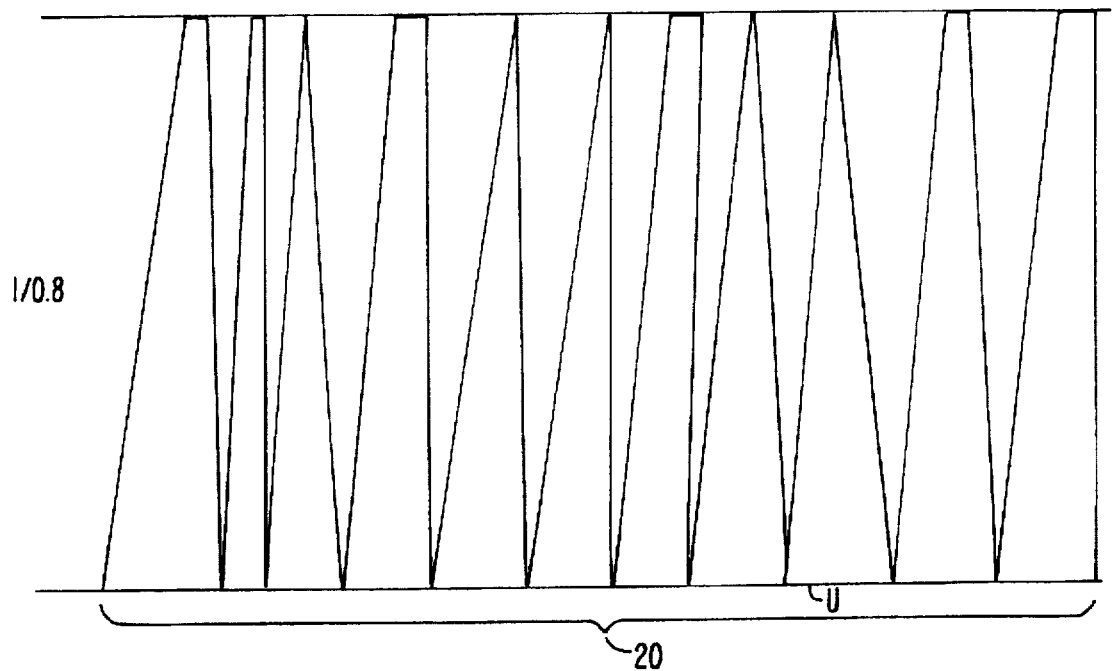
FIG. 11 illustrates the diagram of FIG. 10 with the first order transmission being renormalized to produce the altered cell of this invention having preferred high first order transmission.

The circumstance of FIG. 11 is quite different. In creation of images I, the relative size of average maxima 16 differs in two important effects. First, and as compared to FIG. 8, the hologram of FIG. 11 transmits a much large fraction of light from the order of light making up the hologram (usually the first order). Second, average maxima 16 approaches the full transmission characteristics of the illustrated hologram.

Figure 12A:
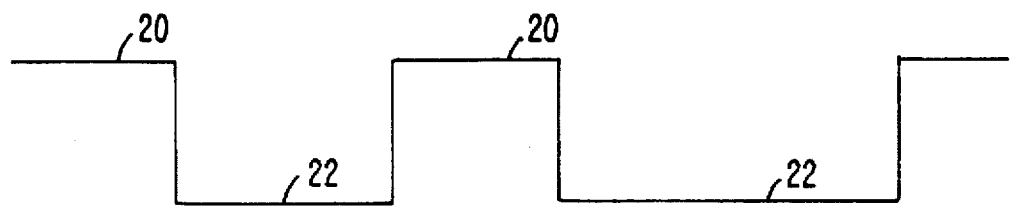
FIG. 12A and 12B illustrate a side elevation of a mask at an optical feature with the mask being etch to λ/2 and λ/4 respectively.
Figure 12B:
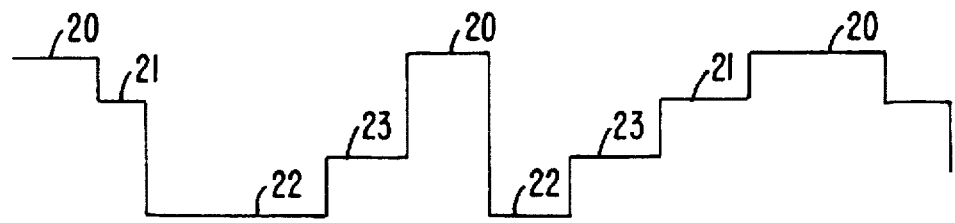
Figure 13A:
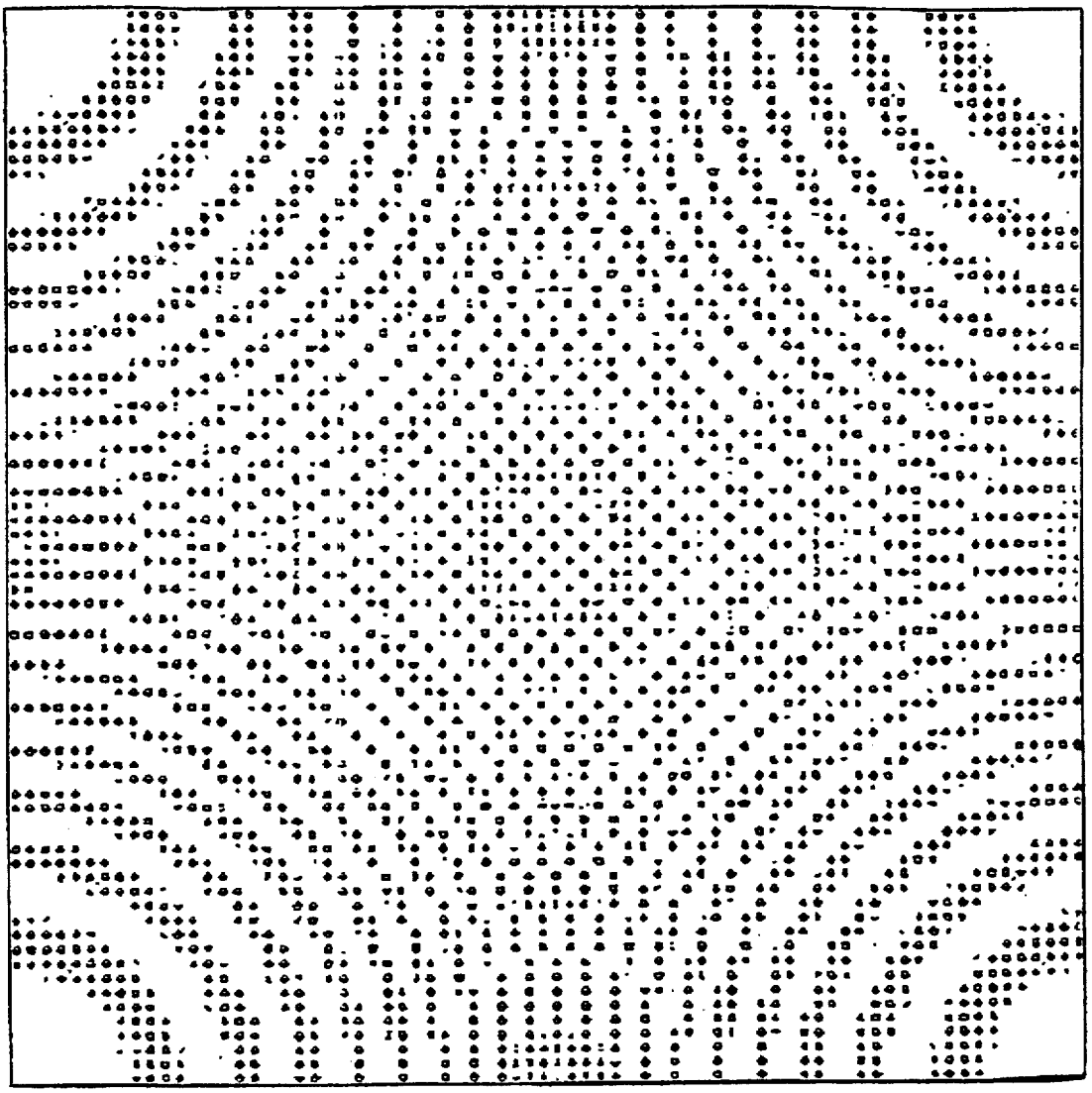
FIG. 13A and 13B illustrate a greatly expanded planar map of a microscopic section of the central unit cell having optical features in λ/4 steps; and, FIG. 14A and 14B illustrate a plan view of a unit cell at a small portion of a side edge and small portion of a corner of the mask illustrating alteration of the unit cell for the edge effects where the mask cannot be assumed to be endless in dimension.
Figure 13B:
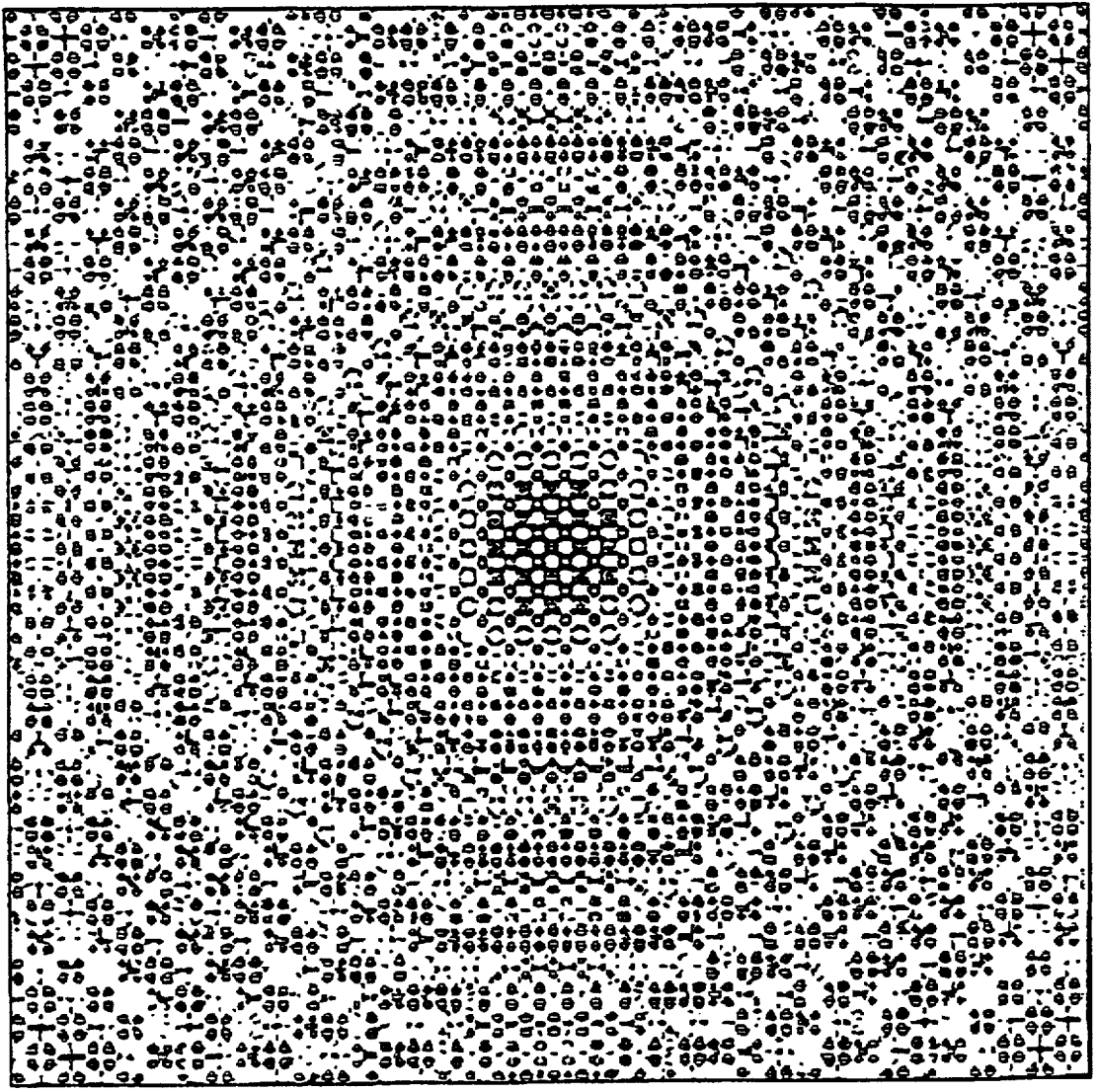

In this invention, we prefer to utilize an optical hologram which is other than binary. Referring to FIG. 12A, such a binary hologram is illustrated in section across one of the optical features. It includes steps 20 and steps 22. In FIG. 12B we illustrate a four level hologram including steps 20–23. FIG. 13A includes a plan view of binary features and FIG. 13B includes a plan view of four level features of holograms for use in generating working images L.

In a related patent application Ser. No. 08/536,767 filed simultaneously herewith on Sept. 29, 1995 and incorporated herein by reference, entitled Multilayer E-Beam Lithography on Nonconducting Substrates, now abandoned we disclose techniques for generating the four level holographic image that we prefer. Accordingly, that patent application is incorporated by reference as if fully set forth herein.

Those having skill in the art will realize that the case of unit cell U that we have illustrated has utility in the central portion of mask M only. This will of course occupy over 95% of the entire mask. However, when the edge of mask M is reached—either at the sides or the corner—appropriate adjustment must be made to the unit cells.

Figure 3:
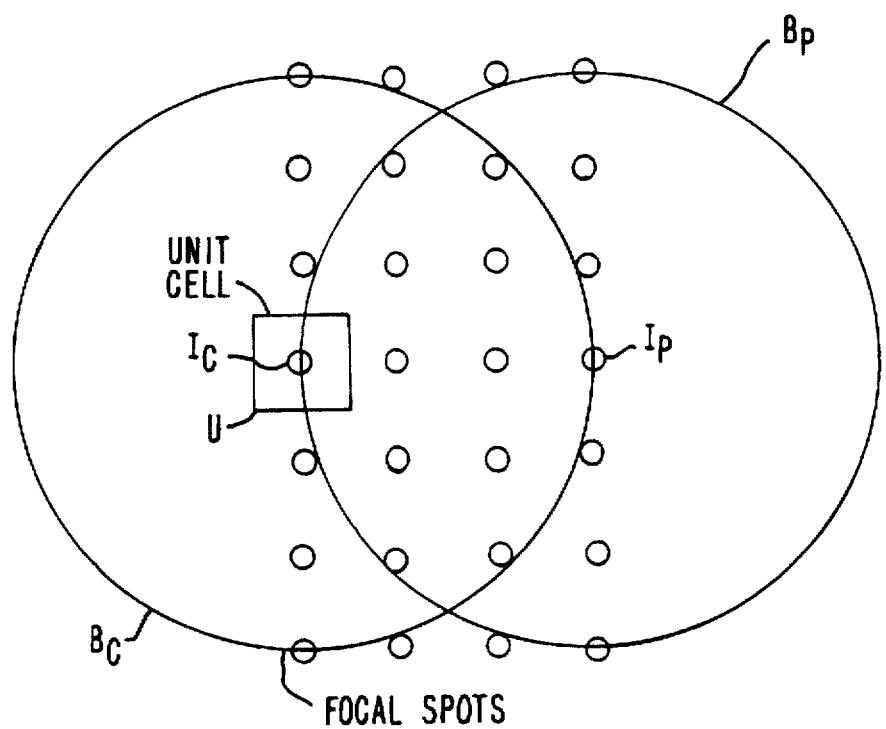
FIG. 3 illustrates the special case of an edge of the mask which would have so-called "edge effects" requiring alteration of the central unit cell.
Figure 14A:
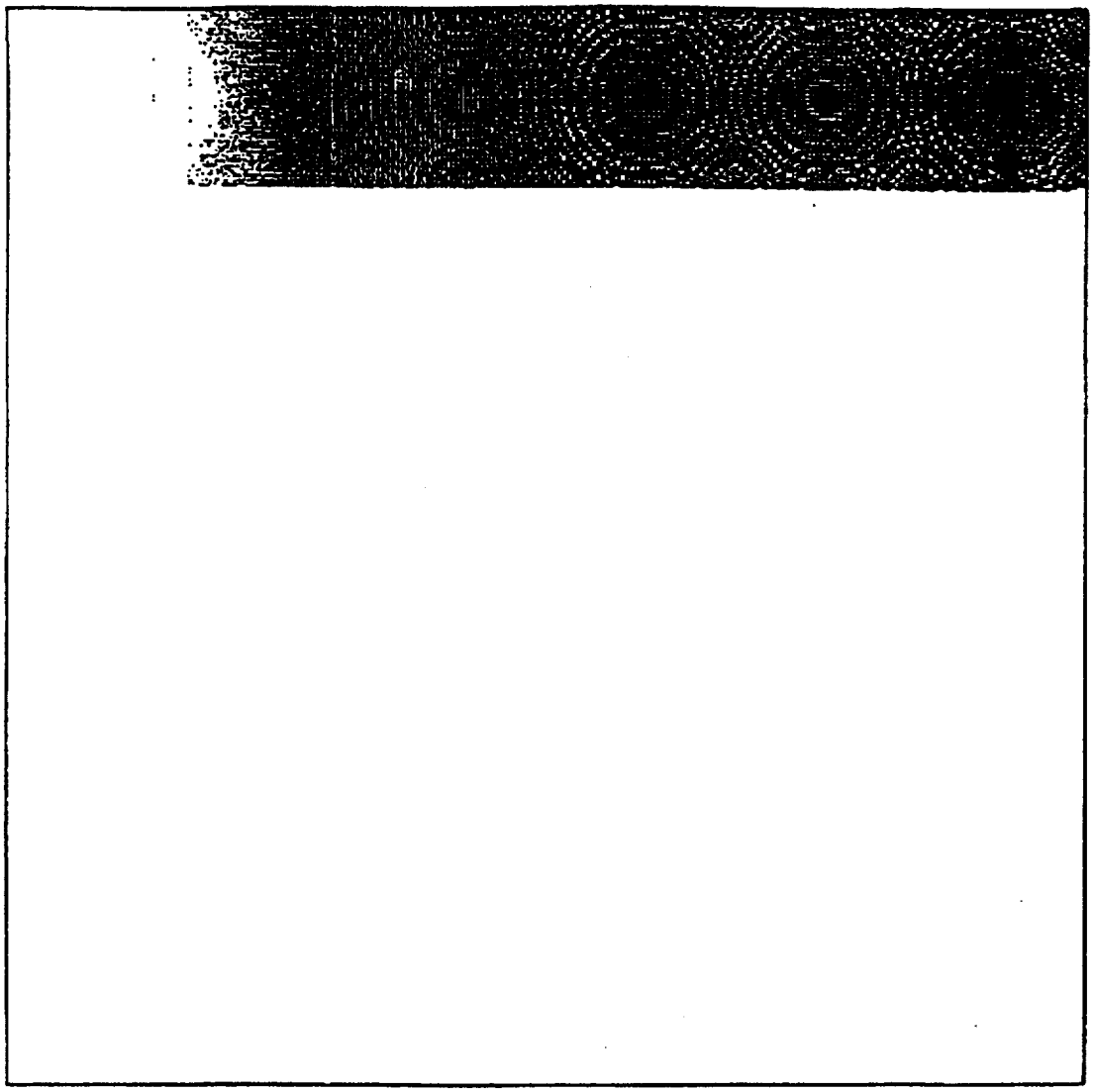
Figure 14B:
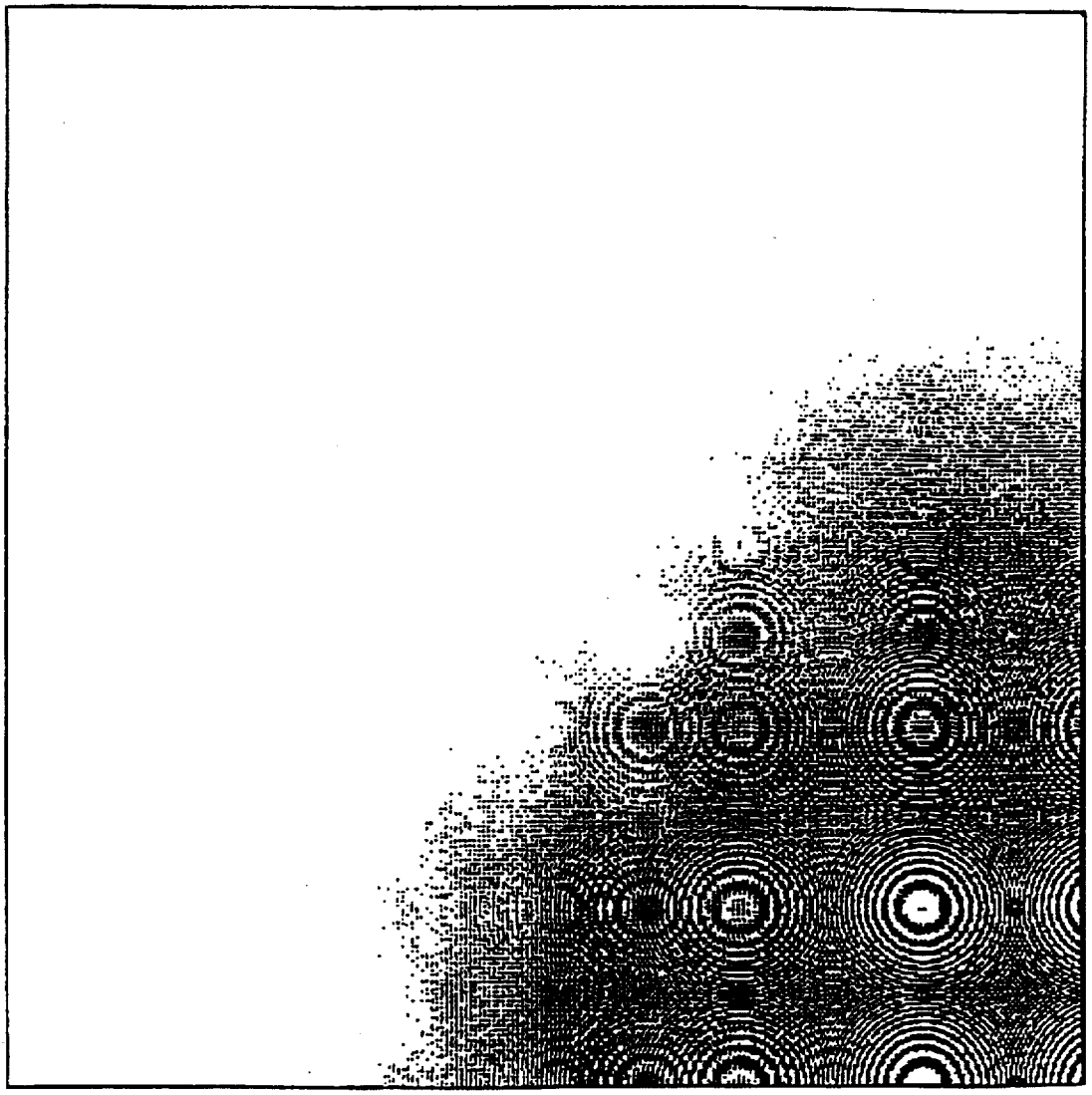

Turning to FIG. 3, the special case of a side of mask M is illustrated. Central image $I_C$ has unit side cell $U_S$ constructed. This cell takes into account only 28 adjacent working images I; likewise with equal logic it will be understood that if a corner were involved, only 16 adjacent working images I would be considered. In either case, for unit side cell $U_S$ or a unit cell located at a corner, the cell generation problem is exactly the same. Manipulation of convergence occurs until for that cell "spikes" or maxima are moved outside of the boundaries of the cell. Thereafter, the cutting of remaining maxima followed by renormalization occurs. Examples of actual cells constructed utilizing this method are illustrated with FIG. 14A being an illustration of the plan view of the side edge condition and FIG. 14B being an illustration of the corner condition.

It will be observed that the holograms produced have a high level of transmission compared to conventionally generated hologram. This in effect means that a much high level of light from the order utilized to create the hologram is transmitted than in the ordinary case of the generation of a conventional hologram. Presuming that we include overlapping apertures, it will be found that utilizing the technique that we set forth here, approximately ten times more light is transmitted by the hologram of our invention.

The reader will understand that other techniques of hologram optimization may be used. These include GerschbergSaxton, genetic algorithm, simulated annealing, direct binary search, and the like can all be used for optimization. However, our configuration is readily recognizable by having:

a. a regular pattern of working images;
b. overlapping subapertures;
c. improved transmission in the order of ten times over conventional holograms which are not treated in their main body to enhance the transmission of light in the order from which the hologram is constructed—usually the first order. Thus we claim invention in the realization that where a regular pattern of working images is to be created, overlapping subapertures with improved transmission is required—and whether that improved transmission is generated by the above listed techniques or the preferred method set forth herein, invention is claimed.

What is claimed is:

1. A process for generating a computer generated holographic plate for producing an array of working images, each working image produced from a subaperture of an array of overlapped subapertures where the overlapped subapertures are comprised of identical side-by-side unit cells and each unit cell contributes to a portion of all images produced by the overlapped subapertures at the unit cell, comprising the steps of:

providing a unit cell having only a portion of a total subaperture, the unit cell having a working distance and a convergence to each image of the array of working images to be generated by the unit cell;

from each working image of the array of working images, back propagating a diverging wave front to produce for that wave front a corresponding holographic image at the unit cell;

adding at the unit cell the corresponding holographic image for each diverging wave front until a computer generated hologram of all diverging wave fronts of the unit cell containing portions of all the working images to be broadcast from the unit cell is attained;

varying projection from the unit cell to the working images by varying a projection parameter selected from the group consisting of, the working distance between the unit cell and all working images, the convergence of light to all the working images, and the working distance between the unit cell and all working images and the convergence of light to all the working images, to obtain for the unit cell a smaller local maximum transmission requirement within the unit cell;

reducing in intensity of the smaller local maximum transmission requirement for the unit cell;

renormalizing the reduced intensity of the smaller local maximum transmission requirement for the unit cell to creat an optimized unit cell; and, repeating the optimized unit cell to form the side-by-side unit cells to create the computer generated holographic plate.

2. A process for generating a computer generated holographic plate for producing an array of working images according to claim 1 and wherein:

the holographic image at the unit cell is in the first order is propagated using Fresnel diffraction.

3. A process for generating a computer generated holographic plate for producing an array of working images according to claim 1 and wherein:

varying projection from the unit cell to the working images to eliminate large local maximum first order transmission requirements by moving the large local maximum first order transmission requirements outside the bounds of the unit cell.

4. A process for generating a computer generated holographic plate for producing an array of working images according to claim 1 and wherein:

varying projection from the unit cell to the working images where the smallest local maximum first order transmission requirement is arbitrarily clipped in transmission of the first order.

5. A process for generating a computer generated holographic plate for producing an array of working images according to claim 1 and wherein:

the provided unit mask cell is a central unit cell.

6. A computer generated holographic plate for producing an array of working images, each working image produced from a subaperture of an array of overlapped subapertures where the overlapped subapertures are comprised of identical side-by-side unit cells and each unit cell contributes to a portion of all images produced by the overlapped subapertures at the unit cell, the computer generated holographic plate comprising:

a plurality of repeating side-by-side unit cells; where each of the unit cells comprises only a portion of a total subaperture, and has a working distance and convergence to each image of the regular array of working images generated by the unit cell;

and from each working image of the regular array of working images a diverging wave front is back propagated to produce for that wave front a corresponding holographic image at the unit cell;

and the holographic images for each working image are added at the unit cell to obtain a computer generated hologram of the diverging wave fronts of the unit cell containing portions of all the working images to be broadcast from the unit cell.

* * * * *